US012753335B2

(12) United States Patent
Tsao et al.

(10) Patent No.: US 12,753,335 B2
(45) Date of Patent: Oct. 6, 2026

(54) POLYMER AND THERMAL INTERFACE MATERIAL

(71) Applicant: INDUSTRIAL TECHNOLOGY RESEARCH INSTITUTE, Hsinchu (TW)

(72) Inventors: Hsiang-Yen Tsao, Zhubei City (TW); Hui-Wen Chang, Hsinchu City (TW); Jyh-Long Jeng, New Taipei City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 760 days.

(21) Appl. No.: 18/180,609

(22) Filed: Mar. 8, 2023

(65) Prior Publication Data

US 2024/0228854 A1 Jul. 11, 2024

(30) Foreign Application Priority Data

Dec. 5, 2022 (TW) ................................. 111146498

(51) Int. Cl.
*C09K 5/14* (2006.01)
*C08G 59/02* (2006.01)
*C08G 69/40* (2006.01)

(52) U.S. Cl.
CPC ................ *C09K 5/14* (2013.01); *C08G 59/02* (2013.01); *C08G 69/40* (2013.01)

(58) Field of Classification Search
CPC ........................................................ C09K 5/14
See application file for complete search history.

(56) References Cited

U.S. PATENT DOCUMENTS

| | | | |
|---|---|---|---|
| 237,768 A | 2/1881 | O'Brien | |
| 3,965,096 A | 6/1976 | Reinisch et al. | |
| 4,469,609 A * | 9/1984 | Bandlish | C10M 133/02 508/516 |
| 8,557,948 B2 | 10/2013 | Tomizawa et al. | |
| 8,728,712 B2 | 5/2014 | Yabuki et al. | |
| 8,735,483 B2 | 5/2014 | Muro et al. | |
| 8,766,388 B2 | 7/2014 | Ikeda et al. | |
| 9,389,505 B2 | 7/2016 | Shimada et al. | |
| 9,389,507 B2 | 7/2016 | Ikeda et al. | |
| 9,620,542 B2 | 4/2017 | Ezoe et al. | |
| 9,657,182 B2 | 5/2017 | Ezoe et al. | |
| 10,036,838 B2 | 7/2018 | Bak et al. | |
| 10,059,866 B2 * | 8/2018 | Liu | C09K 5/14 |
| 2010/0112474 A1 | 5/2010 | Iwasaki et al. | |
| 2011/0237768 A1 | 9/2011 | Katoh et al. | |
| 2012/0183776 A1 | 7/2012 | Arioka et al. | |
| 2012/0282549 A1 | 11/2012 | Tomizawa et al. | |
| 2016/0347933 A9 | 12/2016 | Carney et al. | |

FOREIGN PATENT DOCUMENTS

| | | | | |
|---|---|---|---|---|
| CN | 104823083 A | | 8/2015 | |
| CN | 104854486 A | | 8/2015 | |
| CN | 105086378 A | * | 11/2015 | |
| CN | 114230485 A | | 3/2022 | |
| EP | 0 724 008 A1 | | 7/1996 | |
| EP | 0724006 A1 | * | 7/1996 | C08G 59/22 |
| JP | 2002-212265 A | | 7/2002 | |
| JP | 2013018928 A | * | 1/2013 | |
| TW | 201139534 A1 | | 11/2011 | |
| TW | 201326328 A1 | | 7/2013 | |
| TW | 201331713 A1 | | 8/2013 | |
| TW | I558740 B | | 11/2016 | |
| TW | I575016 B | | 3/2017 | |
| TW | 201720888 A | | 6/2017 | |
| TW | I598294 B | | 9/2017 | |
| TW | I598419 B | | 9/2017 | |
| TW | I624518 B | | 5/2018 | |
| TW | I631167 B | | 8/2018 | |

(Continued)

OTHER PUBLICATIONS

Carfagna et al. ("Liquid-crystalline epoxy resins: a glycidyl-terminated benzaldehyde azine cured in the nematic phase", Macromol. Chem. Phys. 195, 279-287, 1994) (Year: 1994).*

(Continued)

*Primary Examiner* — Matthew R Diaz
(74) *Attorney, Agent, or Firm* — Birch, Stewart, Kolasch & Birch, LLP

(57) ABSTRACT

A polymer is formed by reacting (a) benzaldazine compound with (b1) diamine compound, (b2) dianhydride compound, (b3) epoxy resin, or a combination thereof, wherein (a) benzaldazine compound has a chemical structure of

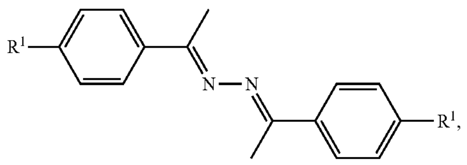

in which $R^1$ is $-NH_2$, —OH, or

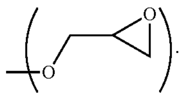

The polymer can be combined with inorganic powder to form a thermal interface material.

6 Claims, No Drawings

(56) References Cited

FOREIGN PATENT DOCUMENTS

| | | | | |
|---|---|---|---|---|
| TW | I654218 B | | 3/2019 | |
| WO | WO-2017066929 A1 | * | 4/2017 | ........... C08G 59/245 |

OTHER PUBLICATIONS

Carfagna et al. ("Water sorption in a novel liquid crystalline epoxy resin", Polymer Engineering and Science, Jan. 1995, vol. 35, No. 2, 137-143) (Year: 1995).*

Grebowicz ("On the formation of liquid crystalline texture in epoxy resins", Macromol. Symp. 104, 191-221, 1996) (Year: 1996).*

Giamberini et al. ("A novel approach to the tailoring of polymers for advanced composites and optical applications, involving the synthesis of liquid crystalline epoxy resins", Polymer Engineering and Science, Mar. 1999, vol. 39, No. 3, 534-542) (Year: 1999).*

Ahmed et al., "The electrical conductivity of benzaldazine and its o-, m- AND p-hydroxy substituents", Thermochimica Acta, 1990, 168, pp. 25-30.

Ray et al., "Spectral properties of a simple azine Schiff base and its sensing ability towards protic environment through hydrogen bonding interaction", Elsevier, Spectrochimica Acta Part A: Molecular and Biomolecular Spectroscopy, 2013, 115, pp. 219-226.

Taiwanese Office Action and Search Report for corresponding Taiwanese Application No. 111146498, dated Aug. 15, 2023.

* cited by examiner

POLYMER AND THERMAL INTERFACE MATERIAL

CROSS REFERENCE TO RELATED APPLICATIONS

The present application is based on, and claims priority from, Taiwan Application Serial No. 111146498, filed on Dec. 5, 2022, the disclosure of which is hereby incorporated by reference herein in its entirety.

TECHNICAL FIELD

The technical field relates to a thermal interface material, and in particular, it relates to a polymer utilized in a thermal interface material.

BACKGROUND

Various electronic products are under development, in order to achieve light weight, smaller and thinner dimensions, and to have high performance. The internal waste heat generated by such electronic products cannot be effectively dissipated due to poor bonding surfaces or air barriers between the various electronic components. If the temperature of the components gets too high, the electronic product will fail to operate properly and may break down. As such, a thermal interface material is required, wherein the thermal interface material can be closely attached to the electronic components so that it can effectively dissipate heat.

For enhancing the thermal conductivity of the thermal interface material, a large amount of inorganic powder is usually added into a resin to achieve high thermal conductivity. However, the addition of inorganic powder can lead to poor processability or loss of the original mechanical properties of the resin. Accordingly, the development of a novel thermal conductive resin for directly increasing the thermal conductivity of the resin is called for. As such, the high thermal conductivity of the thermal interface material can still be achieved by adding less amount of the inorganic powder.

SUMMARY

One embodiment of the disclosure provides a polymer, formed by reacting (a) benzaldazine compound with (b1) diamine compound, (b2) dianhydride compound, (b3) epoxy resin, or a combination thereof, wherein (a) benzaldazine compound has a chemical structure of

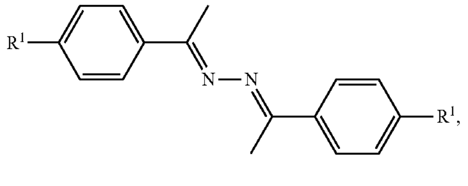

in which $R^1$ is —$NH_2$, —OH, or

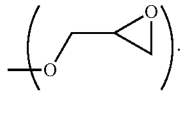

One embodiment of the disclosure provides a thermal interface material, including 2 to 30 parts by weight of the polymer; and 70 to 98 parts by weight of an inorganic powder.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

One embodiment of the disclosure provides a polymer, formed by reacting (a) benzaldazine compound with (b1) diamine compound, (b2) dianhydride compound, (b3) epoxy resin, or a combination thereof, wherein (a) benzaldazine compound has a chemical structure of

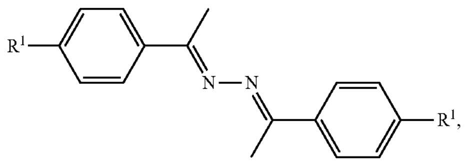

in which $R^1$ is —$NH_2$, —OH, or

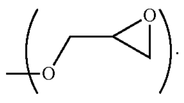

In some embodiments, $R^1$ is —$NH_2$, and the polymer is formed by reacting (a) benzaldazine compound with (b2) dianhydride compound, or formed by reacting (a) benzaldazine compound with (b3) epoxy resin. In some embodiments, $R^1$ is —$NH_2$, and the polymer is formed by reacting (a) benzaldazine compound with (b1) diamine compound and (b2) dianhydride compound or formed by reacting (a) benzaldazine compound with (b1) diamine compound and (b3) epoxy resin. In some embodiments, $R^1$ is —OH, and the polymer is formed by reacting (a) benzaldazine compound with (b3) epoxy resin. In some embodiments, $R^1$ is

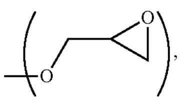

and the polymer is formed by reacting (a) benzaldazine compound with (b1) diamine compound. In some embodiments, $R^1$ is

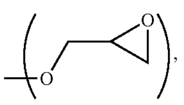

and the polymer is formed by reacting (a) benzaldazine compound with (b3) epoxy resin and (b1) diamine compound.

In some embodiments, parts by mole of (a) benzaldazine compound and parts by mole of (b1) diamine compound, (b2) dianhydride compound, (b3) epoxy resin, or a combination thereof have a ratio of 0.11:1 to 2:1.

In some embodiments, (b1) diamine compound includes 4,4'-oxydianiline, polyetheramine (such as Jeffamine D400 with a molecular weight of 400), 4,4'-diaminodiphenylmethane, trimethylene bis(4-aminobenzoate), 4,4'-bis(4-aminophenoxy)biphenyl, 4,4'-methylenebis(2-methylcyclohexylamine), bis(aminomethyl)norbornane, or 1,4-bis (aminopropyl)piperazine.

In some embodiments, (b2) dianhydride compound includes 4,4-oxydiphthalic anhydride, 4,4'-(4,4'-isopropylidenediphenoxy)bis(phthalic anhydride), 1,2,4,5-cyclohexane tetracarboxylic dianhydride, pyromellitic dianhydride, 3,3'-4,4'-biphenyl tetracarboxylic dianhydride, 4,4'-(hexafluoro isopropylidene)diphthalic anhydride, or benzophenone-3,3',4,4'-tetracarboxylic dianhydride.

In some embodiments, (b3) epoxy resin includes bisphenol A epoxy resin, 3,3',5,5'-tetramethyl-4,4'-diphenol diglycidyl ether, neopentyl glycol diglycidyl ether, hydrogenated bisphenol A epoxy resin, 1,4-cyclohexanedimethanol diglycidyl ether, or N, N-diglycidyl-4-glycidyloxyaniline.

One embodiment of the disclosure provides a thermal interface material, including 2 to 30 parts by weight of the polymer; and 70 to 98 parts by weight of an inorganic powder. If the amount of the inorganic powder is too low, the thermal interface material will have insufficient thermal conductivity. If the amount of the inorganic powder is too high, the processability of the thermal interface material will be poor (e.g. occurrence of crack during film formation). In some embodiments, the inorganic powder includes aluminum oxide, aluminum nitride, boron nitride, silicon carbide, magnesium oxide, zinc oxide, or a combination thereof. In some embodiments, the thermal interface material has a thermal conductivity of 2.0 W/m*K to 10.0 W/*K.

Below, exemplary embodiments will be described in detail so as to be easily realized by a person having ordinary knowledge of the art. The inventive concept may be embodied in various forms without being limited to the exemplary embodiments set forth herein. Descriptions of well-known parts are omitted for clarity.

EXAMPLES

In following Examples, the thermal conductivities of the thermal interface materials were measured according to the standard ASTM E1461.

Synthesis Example 1

42.00 g of 4-aminoacetophenone, 78.61 g of triethylamine, and 44.47 g of ethanol were mixed and then heated to 60° C. to be completely dissolved. 20.22 g of hydrazine sulfate was then added into the solution, heated to reflux and react for 5 hours. The reaction result was cooled to room temperature and then poured into 1.0 L of de-ionized water to precipitate the product. The product was filtered out, and the filtered cake was washed out by water until the filtrate was neutralized. The filtered cake was baked in a circulator oven (110° ° C. for 12 hours) to obtain 35.00 g of product. The hydrogen spectrum of the product is shown below: $^1$H NMR (500 MHZ, DMSO-$d_6$): δ 2.211 (s, 6H, —$CH_3$), 5.436 (s, 4H, —$NH_2$), 6.58 (d, 4H, J=8.5 Hz, Ar—H), 7.61 (d, 4H, J=8.5 Hz, Ar—H). The chemical structure of the product is shown below:

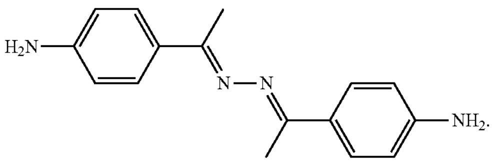 [SMILES: C/C(=N\N=C(/C)c1ccc(N)cc1)c1ccc(N)cc1]

Synthesis Example 2

80.00 g of 4-hydroxyacetophenone, 148.64 g of triethylamine, and 106.38 g of ethanol were mixed and then heated to 75° C. to be completely dissolved. 38.23 g of hydrazine sulfate was then added into the solution, heated to reflux and react for 6 hours. The reaction result was cooled to room temperature and then poured into 1.5 L of de-ionized water to precipitate the product. The product was filtered out, and the filtered cake was washed out by water until the filtrate was neutralized. The filtered cake was baked in a circulator oven (110° C. for 12 hours) to obtain 45.84 g of product. The hydrogen spectrum of the product is shown below: $^1$H NMR (500 MHz, DMSO-$d_6$): δ 2.246 (s, 6H, —$CH_3$), 6.81 (d, 4H, J=8.5 Hz, Ar—H), 7.76 (d, 4H, J=8.5 Hz, Ar—H), 9.783 (s, 2H, OH). The chemical structure of the product is shown below:

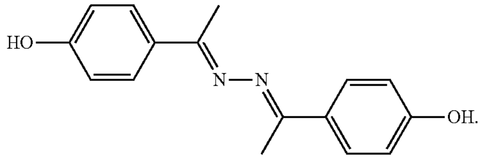 [SMILES: C/C(=N\N=C(/C)c1ccc(O)cc1)c1ccc(O)cc1]

Synthesis Example 3

20 g of hydroxy hydrazine, 43.83 g of epichlorohydrin, 0.030 g of tetra-n-butylammonium chloride, and 100 g of DMSO were mixed and heated to and kept at 90° C. for 1 hour to be completely dissolved. 45% of sodium hydroxide aqueous solution (5.05 g of sodium hydroxide and 6.18 g of de-ionized water) was added dropwise into the solution and then reacted at 90° C. for 1.5 hours. By the end of the reaction, the solution was directly filtered at a high temperature (without being cooled) to remove the salt. The filtrate was poured into 1 L of water and put into a refrigerator to precipitate the product overnight. The product was filtered out, and the filtered cake was washed out with about 200 mL of methanol. The filtered cake was baked in a circulator oven (80° C. for 6 hours) to obtain 14.57 g of product. The hydrogen spectrum of the product is shown below: $^1$H NMR (500 MHZ, DMSO-$d_6$): δ 2.265 (s, 6H, —$CH_3$), 2.72 (m, 2H, —CH), 2.848 (t, 2H, J=4.5H, —CH), 3.34 (m, 2H, —CH), 3.88 (m, 2H, —CH), 4.39 (m, 2H, —CH), 7.02 (d, 4H, J=9.0 Hz, Ar—H), 7.852 (d, 4H, J=9.0 Hz, Ar—H). The chemical structure of the product is shown below:

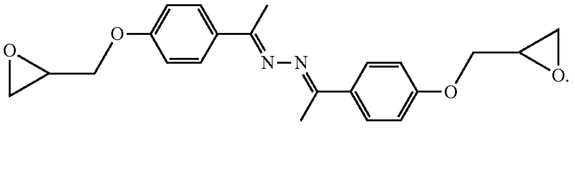 [SMILES: C/C(=N\N=C(/C)c1ccc(OCC2CO2)cc1)c1ccc(OCC2CO2)cc1]

Example 1

0.02 parts by mole of the product in Synthesis Example 1 serving as (a) benzaldazine compound ($R^1$=$NH_2$), 0.08 parts by mole of 4,4'-oxydianiline (ODA) serving as (b1) diamine compound, and 0.10 parts by mole of 4,4-oxydiphthalic anhydride (ODPA) serving as (b2) dianhydride compound were dissolved in 209.44 mL of N-methyl-2-pyrrolidone (NMP) to form a clear solution, which was heated to 40° C. to react for 4 hours to form a polymer. The reactants ratio is (a):(b1)+(b2)=0.11:1. The polymer solution was coated by a blade to form a film, which was baked to form a polymer film with a thermal conductivity of 0.283 W/m*K.

Example 2

0.05 parts by mole of the product in Synthesis Example 1 serving as (a) benzaldazine compound ($R^1$=$NH_2$), 0.05 parts by mole of ODA serving as (b1) diamine compound, and 0.10 parts by mole of ODPA serving as (b2) dianhydride compound were dissolved in 217.34 mL of NMP to form a clear solution, which was heated to 40° C. to react for 4 hours to form a polymer. The reactants ratio is (a):(b1)+(b2)=0.33:1. The polymer solution was coated by a blade to form a film, which was baked to form a polymer film with a thermal conductivity of 0.320 W/m*K.

Example 3

0.05 parts by mole of the product in Synthesis Example 1 serving as (a) benzaldazine compound ($R^1$=$NH_2$), 0.05 parts by mole of ODA serving as (b1) diamine compound, and 0.10 parts by mole of 4,4'-(4,4'-isopropylidenediphenoxy)bis(phthalic anhydride) (BPADA) serving as (b2) dianhydride compound were dissolved in 301.44 mL of NMP to form a clear solution, which was heated to 40° C. to react for 4 hours to form a polymer. The reactants ratio is (a):(b1)+(b2)=0.33:1. The polymer solution was coated by a blade to form a film, which was baked to form a polymer film with a thermal conductivity of 0.267 W/m*K.

Example 4

0.05 parts by mole of the product in Synthesis Example 1 serving as (a) benzaldazine compound ($R^1$=$NH_2$), 0.05 parts by mole of ODA serving as (b1) diamine compound, and 0.07 parts by mole of ODPA and 0.03 parts by mole of 1,2,4,5-cyclohexane tetracarboxylic dianhydride (H-PMDA) serving as (b2) dianhydride compound were dissolved in 207.01 mL of NMP to form a clear solution, which was heated to 40° C. to react for 4 hours to form a polymer. The reactants ratio is (a):(b1)+(b2)=0.33:1. The polymer solution was coated by a blade to form a film, which was baked to form a polymer film with a thermal conductivity of 0.300 W/m*K.

Example 5

0.05 parts by mole of the product in Synthesis Example 1 serving as (a) benzaldazine compound ($R^1$=$NH_2$), 0.05 parts by mole of ODA serving as (b1) diamine compound, and 0.07 parts by mole of ODPA and 0.03 parts by mole of pyromellitic dianhydride (PMDA) serving as (b2) dianhydride compound were dissolved in 207.28 mL of NMP to form a clear solution, which was heated to 40° C. to react for 4 hours to form a polymer. The reactants ratio is (a):(b1)+(b2)=0.33:1. The polymer solution was coated by a blade to form a film, which was baked to form a polymer film with a thermal conductivity of 0.352 W/m*K.

Example 6

0.05 parts by mole of the product in Synthesis Example 1 serving as (a) benzaldazine compound ($R^1$=$NH_2$), 0.05 parts by mole of ODA serving as (b1) diamine compound, and 0.07 parts by mole of ODPA and 0.03 parts by mole of 3,3'-4,4'-biphenyl tetracarboxylic dianhydride (BPDA) serving as (b2) dianhydride compound were dissolved in 215.41 mL of NMP to form a clear solution, which was heated to 40° C. to react for 4 hours to form a polymer. The reactants ratio is (a):(b1)+(b2)=0.33:1. The polymer solution was coated by a blade to form a film, which was baked to form a polymer film with a thermal conductivity of 0.329 W/m*K.

Example 7

0.05 parts by mole of the product in Synthesis Example 1 serving as (a) benzaldazine compound ($R^1$=$NH_2$), 0.05 parts by mole of ODA serving as (b1) diamine compound, and 0.05 parts by mole of ODPA and 0.05 parts by mole of 4,4'-(hexafluoro isopropylidene)diphthalic anhydride (6FDA) serving as (b2) dianhydride compound were dissolved in 244.14 mL of NMP to form a clear solution, which was heated to 40° C. to react for 4 hours to form a polymer. The reactants ratio is (a):(b1)+(b2)=0.33:1. The polymer solution was coated by a blade to form a film, which was baked to form a polymer film with a thermal conductivity of 0.278 W/m*K.

Example 8

0.05 parts by mole of the product in Synthesis Example 1 serving as (a) benzaldazine compound ($R^1$=$NH_2$), 0.05 parts by mole of ODA serving as (b1) diamine compound, and 0.08 parts by mole of ODPA and 0.02 parts by mole of benzophenone-3,3',4,4'-tetracarboxylic dianhydride (BTDA) serving as (b2) dianhydride compound were dissolved in 218.29 mL of NMP to form a clear solution, which was heated to 40° C. to react for 4 hours to form a polymer. The reactants ratio is (a):(b1)+(b2)=0.33:1. The polymer solution was coated by a blade to form a film, which was baked to form a polymer film with a thermal conductivity of 0.307 W/m*K.

Comparative Example 1

0.10 parts by mole of ODA serving as (b1) diamine compound and 0.10 parts by mole of ODPA serving as (b2) dianhydride compound were dissolved in 204.18 mL of NMP to form a clear solution, which was heated to 40° C. to react for 4 hours to form a polymer. The reactants ratio is (a):(b1)+(b2)=0:1. The polymer solution was coated by a blade to form a film, which was baked to form a polymer film with a thermal conductivity of 0.220 W/m*K. As shown in Examples 1 to 8 and Comparative Example 1, the polymer formed without (a) benzaldazine compound had an insufficient thermal conductivity.

Example 9

0.05 parts by mole of the product in Synthesis Example 1 serving as (a) benzaldazine compound ($R^1$=$NH_2$) and 0.04 parts by mole of bisphenol A epoxy resin (828 commercially available from Mitsubishi Chemical) serving as (b3) epoxy resin were dissolved in 118.21 mL of N, N-dimethylacetamide (DMAc) to form a clear solution. The reactants ratio is (a):(b3)=1.25:1. The clear solution was coated by a blade to form a film, which was baked to form a polymer film with a thermal conductivity of 0.271 W/m*K.

Example 10

0.05 parts by mole of the product in Synthesis Example 1 serving as (a) benzaldazine compound ($R^1$=$NH_2$) and 0.10 parts by mole of 828 serving as (b3) epoxy resin were dissolved in 182.47 mL of DMAc to form a clear solution. The reactants ratio is (a):(b3)=0.5:1. The clear solution was coated by a blade to form a film, which was baked to form a polymer film with a thermal conductivity of 0.285 W/m*K.

Example 11

0.015 parts by mole of the product in Synthesis Example 1 serving as (a) benzaldazine compound ($R^1$=$NH_2$), 0.035 parts by mole of polyether amine (Jeffamine D400 with a molecular weight of 400, commercially available from Huntsman) serving as (b1) diamine compound, and 0.10 parts by mole of 828 serving as (b3) epoxy resin were dissolved in 152.52 mL of DMAc to form a clear solution. The reactants ratio is (a):(b1)+(b3)=0.11:1. The clear solution was coated by a blade to form a film, which was baked to form a polymer film with a thermal conductivity of 0.268 W/m*K.

Example 12

0.05 parts by mole of the product in Synthesis Example 1 serving as (a) benzaldazine compound ($R^1$=$NH_2$) and 0.10 parts by mole of hydrogenated bisphenol A epoxy resin (YX8000 commercially available from Mitsubishi Chemical) serving as (b3) epoxy resin were dissolved in 191.53 mL of DMAc to form a clear solution. The reactants ratio is (a):(b3)=0.5:1. The clear solution was coated by a blade to form a film, which was baked to form a polymer film with a thermal conductivity of 0.296 W/m*K.

Example 13

0.05 parts by mole of the product in Synthesis Example 1 serving as (a) benzaldazine compound ($R^1$=$NH_2$) and 0.10 parts by mole of 3,3',5,5'-tetramethyl-4,4'-diphenol diglycidyl ether (YX4000 commercially available from Mitsubishi Chemical) serving as (b3) epoxy resin were dissolved in 180.77 mL of DMAc to form a clear solution. The reactants ratio is (a):(b3)=0.5:1. The clear solution was coated by a blade to form a film, which was baked to form a polymer film with a thermal conductivity of 0.310 W/m*K.

Example 14

0.05 parts by mole of the product in Synthesis Example 1 serving as (a) benzaldazine compound ($R^1$=$NH_2$) and 0.10 parts by mole of neopentyl glycol diglycidyl ether (NEO) serving as (b3) epoxy resin were dissolved in 114.98 mL of DMAc to form a clear solution. The reactants ratio is (a):(b3)=0.5:1. The clear solution was coated by a blade to form a film, which was baked to form a polymer film with a thermal conductivity of 0.265 W/m*K.

Example 15

0.05 parts by mole of the product in Synthesis Example 1 serving as (a) benzaldazine compound ($R^1$=$NH_2$) and 0.10 parts by mole of 1,4-cyclohexanedimethanol diglycidyl (CDMDG) serving as (b3) epoxy resin were dissolved in 162.81 mL of DMAc to form a clear solution. The reactants ratio is (a):(b3)=0.5:1. The clear solution was coated by a blade to form a film, which was baked to form a polymer film with a thermal conductivity of 0.283 W/m*K.

Example 16

0.05 parts by mole of the product in Synthesis Example 1 serving as (a) benzaldazine compound ($R^1$=$NH_2$) and 0.10 parts by mole of N, N-diglycidyl-4-glycidyloxyaniline (JER630 commercially available from Mitsubishi Chemical) serving as (b3) epoxy resin were dissolved in 130.62 mL of DMAc to form a clear solution. The reactants ratio is (a):(b3)=0.5:1. The clear solution was coated by a blade to form a film, which was baked to form a polymer film with a thermal conductivity of 0.307 W/m*K.

Example 17

0.05 parts by mole of the product in Synthesis Example 2 serving as (a) benzaldazine compound ($R^1$=OH), 0.025 parts by mole of Jeffamine D400 serving as (b1) diamine compound, and 0.10 parts by mole of YX4000 serving as (b3) epoxy resin were dissolved in 197.625 mL of DMAc to form a clear solution. The reactants ratio is (a):(b1)+(b3)=0.4:1. The clear solution was coated by a blade to form a film, which was baked to form a polymer film with a thermal conductivity of 0.289 W/m*K.

Example 18

0.10 parts by mole of the product in Synthesis Example 2 serving as (a) benzaldazine compound ($R^1$=OH) and 0.10 parts by mole of YX4000 serving as (b3) epoxy resin were dissolved in 257.27 mL of DMAc to form a clear solution. The reactants ratio is (a):(b3)=1:1. The clear solution was coated by a blade to form a film, which was baked to form a polymer film with a thermal conductivity of 0.303 W/m*K.

Comparative Example 2

0.05 parts by mole of Jeffamine D400 serving as (b1) diamine compound and 0.10 parts by mole of NEO serving as (b3) epoxy resin were evenly stirred to form a clear solution. The reactants ratio is (a):(b1)+(b3)=0:1. The clear solution was coated by a blade to form a film, which was baked to form a polymer film with a thermal conductivity of 0.203 W/m*K. As shown in Examples 9 to 18 and Comparative Example 2, the polymer formed without (a) benzaldazine compound had an insufficient thermal conductivity.

Comparative Example 3

0.06 parts by mole of the product in Synthesis Example 1 serving as (a) benzaldazine compound ($R^1$=$NH_2$) and 0.027 parts by mole of 828 serving as (b3) epoxy resin were dissolved in 119.36 mL of DMAc to form a clear solution. The reactants ratio is (a):(b3)=2.22:1. The clear solution was coated by a blade to form a film, which was baked to form a cracked polymer film. As shown in Comparative Example 3, the polymer formed with an excessive amount of (a) benzaldazine compound had poor processability.

Example 19

0.02 parts by mole of the product in Synthesis Example 3 serving as (a) benzaldazine compound

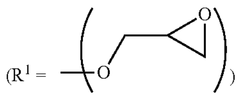

0.05 parts by mole of 4,4'-methylenebis(2-methylcyclohexylamine) (JER113 commercially available from Mitsubishi Chemical) serving as (b1) diamine compound, and 0.08 parts by mole of YX8000 serving as (b3) epoxy resin were dissolved in 182.02 mL of DMAc to form a clear solution. The reactants ratio is (a):(b1)+(b3)=0.15:1. The clear solution was coated by a blade to form a film, which was baked to form a polymer film with a thermal conductivity of 0.254 W/m*K.

Example 20

0.10 parts by mole of the product in Synthesis Example 3 serving as (a) benzaldazine compound

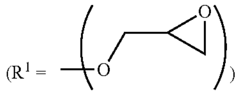

and 0.05 parts by mole of JER113 serving as (b1) diamine compound were dissolved in 175.22 mL of DMAc to form a clear solution. The reactants ratio is (a):(b1)=2:1. The clear solution was coated by a blade to form a film, which was baked to form a polymer film with a thermal conductivity of 0.278 W/m*K.

Example 21

0.10 parts by mole of the product in Synthesis Example 3 serving as (a) benzaldazine compound

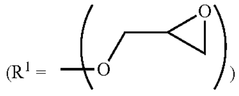

and 0.05 parts by mole of Jeffamine D400 serving as (b1) diamine compound were dissolved in 140.25 mL of DMAc to form a clear solution. The reactants ratio is (a):(b1)=2:1. The clear solution was coated by a blade to form a film, which was baked to form a polymer film with a thermal conductivity of 0.279 W/m*K.

Example 22

0.10 parts by mole of the product in Synthesis Example 3 serving as (a) benzaldazine compound

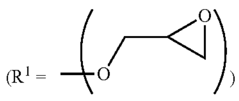

and 0.05 parts by mole of 4,4'-diaminodiphenylmethane (DDM) serving as (b1) diamine compound were dissolved in 163.84 mL of DMAc to form a clear solution. The reactants ratio is (a):(b1)=2:1. The clear solution was coated by a blade to form a film, which was baked to form a polymer film with a thermal conductivity of 0.307 W/m*K.

Example 23

0.10 parts by mole of the product in Synthesis Example 3 serving as (a) benzaldazine compound

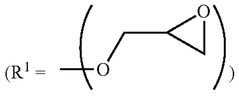

and 0.05 parts by mole of trimethylene bis(4-aminobenzoate) (CUA-4) serving as (b1) diamine compound were dissolved in 196.73 mL of DMAc to form a clear solution. The reactants ratio is (a):(b1)=2:1. The clear solution was coated by a blade to form a film, which was baked to form a polymer film with a thermal conductivity of 0.301 W/m*K.

Example 24

0.10 parts by mole of the product in Synthesis Example 3 serving as (a) benzaldazine compound

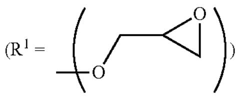

and 0.05 parts by mole of 4,4'-bis(4-aminophenoxy)biphenyl (BAPB) serving as (b1) diamine compound were dissolved in 212.06 mL of DMAc to form a clear solution. The reactants ratio is (a):(b1)=2:1. The clear solution was coated by a blade to form a film, which was baked to form a polymer film with a thermal conductivity of 0.317 W/m*K.

Example 25

0.10 parts by mole of the product in Synthesis Example 3 serving as (a) benzaldazine compound

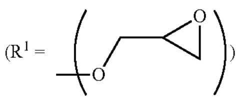

and 0.05 parts by mole of bis(aminomethyl)norbornane (mixture of isomers) (NBDA) serving as (b1) diamine compound were dissolved in 151.37 mL of DMAc to form a clear solution. The reactants ratio is (a):(b1)=2:1. The clear solution was coated by a blade to form a film, which was baked to form a polymer film with a thermal conductivity of 0.293 W/m*K.

Example 26

0.10 parts by mole of the product in Synthesis Example 3 serving as (a) benzaldazine compound

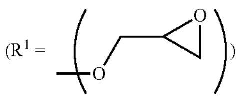

and 0.05 parts by mole of 1,4-bis(aminopropyl)piperazine (BAPPRZ) serving as (b1) diamine compound were dissolved in 164.42 mL of DMAc to form a clear solution. The reactants ratio is (a):(b1)=2:1. The clear solution was coated by a blade to form a film, which was baked to form a polymer film with a thermal conductivity of 0.295 W/m*K.

Comparative Example 4

0.05 parts by mole of JER113 serving as (b1) diamine compound and 0.10 parts by mole of YX8000 serving as (b3) epoxy resin were evenly stirred to form a clear solution. The reactants ratio is (a):(b1)+(b3)=0:1. The clear solution was coated by a blade to form a film, which was baked to form a polymer film with a thermal conductivity of 0.216 W/m*K. As shown in Examples 19 to 26 and Comparative Example 4, the polymer formed without (a) benzaldazine compound had an insufficient thermal conductivity.

Example 27

0.05 parts by mole of the product in Synthesis Example 1 serving as (a) benzaldazine compound ($R^1$=$NH_2$) and 0.10 parts by mole of YX4000 serving as (b3) epoxy resin were dissolved in 180.77 mL of DMAc to form a clear solution. The reactants ratio is (a):(b3)=0.5:1. A thermal conductive powder such as aluminum oxide was added into the clear solution. The weight of aluminum oxide and the weight of (a) benzaldazine compound ($R^1$=$NH_2$) and (b3) epoxy resin had a ratio of 70:30. The mixture was evenly mixed and then coated by a blade to form a film, which was baked to form a thermal interface layer with a thermal conductivity of 2.83 W/m*K.

Example 28

0.05 parts by mole of the product in Synthesis Example 1 serving as (a) benzaldazine compound ($R^1$=$NH_2$) and 0.10 parts by mole of YX4000 serving as (b3) epoxy resin were dissolved in 180.77 mL of DMAc to form a clear solution. The reactants ratio is (a):(b3)=0.5:1. A thermal conductive powder such as aluminum oxide was added into the clear solution. The weight of aluminum oxide and the weight of (a) benzaldazine compound ($R^1$=$NH_2$) and (b3) epoxy resin had a ratio of 98:2. The mixture was evenly mixed and then coated by a blade to form a film, which was baked to form a thermal interface layer with a thermal conductivity of 8.88 W/m*K.

Example 29

0.1 parts by mole of the product in Synthesis Example 3 serving as (a) benzaldazine compound

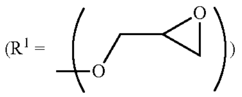

and 0.05 parts by mole of Jeffamine D400 serving as (b1) diamine compound were dissolved in 140.25 mL of DMAc to form a clear solution. The reactants ratio is (a):(b1)=2:1. A thermal conductive powder such as aluminum oxide was added into the clear solution. The weight of aluminum oxide and the weight of (a) benzaldazine compound

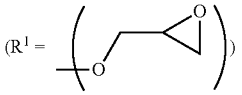

and (b1) epoxy resin had a ratio of 90:10. The mixture was evenly mixed and then coated by a blade to form a film, which was baked to form a thermal interface layer with a thermal conductivity of 5.24 W/m*K.

Example 30

0.02 parts by mole of the product in Synthesis Example 3 serving as (a) benzaldazine compound

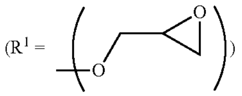

and 0.05 parts by mole of dimethyldicyane (JER113 commercially available from Mitsubishi Chemical) serving as (b1) diamine compound, and 0.08 parts by mole of YX8000 serving as (b3) epoxy resin were dissolved in 182.02 mL of DMAc to form a clear solution. The reactants ratio is (a):(b1)+(b3)=0.15:1. A thermal conductive powder such as aluminum oxide was added into the clear solution. The weight of aluminum oxide and the weight of (a) benzaldazine compound

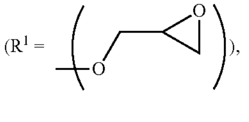

(b1) epoxy resin, and (b3) epoxy resin had a ratio of 90:10. The mixture was evenly mixed and then coated by a blade to form a film, which was baked to form a thermal interface layer with a thermal conductivity of 3.38 W/m*K.

Comparative Example 5

0.05 parts by mole of the product in Synthesis Example 1 serving as (a) benzaldazine compound ($R^1$=$NH_2$) and 0.10 parts by mole of YX4000 serving as (b3) epoxy resin were dissolved in 180.77 mL of DMAc to form a clear solution.

The reactants ratio is (a):(b3)=0.5:1. A thermal conductive powder such as aluminum oxide was added into the clear solution. The weight of aluminum oxide and the weight of (a) benzaldazine compound ($R^1$=$NH_2$) and (b3) epoxy resin had a ratio of 99:1. The mixture was evenly mixed and then coated by a blade to form a film, which was baked to form a cracked thermal interface layer. As shown in Comparative Example 5, the thermal interface material formed with an excessive amount of thermal conductive powder had poor processability.

Comparative Example 6

0.10 parts by mole of the product in Synthesis Example 3 serving as (a) benzaldazine compound

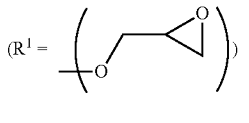

and 0.05 parts by mole of Jeffamine D400 serving as (b1) diamine compound were dissolved in 140.25 mL of DMAc to form a clear solution. The reactants ratio is (a):(b1)=2:1. A thermal conductive powder such as aluminum oxide was added into the clear solution. The weight of aluminum oxide and the weight of (a) benzaldazine compound

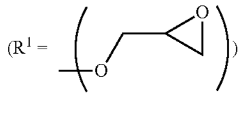

and (b1) diamine compound had a ratio of 99:1. The mixture was evenly mixed and then coated by a blade to form a film, which was baked to form a cracked thermal interface layer. As shown in Comparative Example 6, the thermal interface material formed with an excessive amount of thermal conductive powder had poor processability.

Comparative Example 7

0.02 parts by mole of the product in Synthesis Example 3 serving as (a) benzaldazine compound

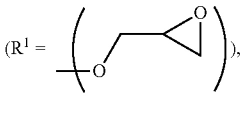

0.05 parts by mole of dimethyldicyane (JER113 commercially available from Mitsubishi Chemical) serving as (b1) diamine compound, and 0.08 parts by mole of YX8000 serving as (b3) epoxy resin were dissolved in 182.02 mL of DMAc to form a clear solution. The reactants ratio is (a):(b1)+(b3)=0.15:1. A thermal conductive powder such as aluminum oxide was added into the clear solution. The weight of aluminum oxide and the weight of (a) benzaldazine compound

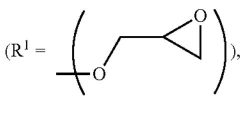

(b1) diamine compound, and (b3) epoxy resin had a ratio of 99:1. The mixture was evenly mixed and then coated by a blade to form a film, which was baked to form a cracked thermal interface layer. As shown in Comparative Example 7, the thermal interface material formed with an excessive amount of thermal conductive powder had poor processability.

Comparative Example 8

0.05 parts by mole of the product in Synthesis Example 1 serving as (a) benzaldazine compound ($R^1$=$NH_2$) and 0.1 parts by mole of YX4000 serving as (b3) epoxy resin were dissolved in 180.77 mL of DMAc to form a clear solution. The reactants ratio is (a):(b3)=0.5:1. A thermal conductive powder such as aluminum oxide was added into the clear solution. The weight of aluminum oxide and the weight of (a) benzaldazine compound ($R^1$=$NH_2$) and (b3) epoxy resin had a ratio of 60:40. The mixture was evenly mixed and then coated by a blade to form a film, which was baked to form a thermal interface layer with a thermal conductivity of 1.75 W/m*K. As shown in Comparative Example 8, the thermal interface material formed with an inadequate amount of thermal conductive powder had an insufficient thermal conductivity.

Comparative Example 9

0.05 parts by mole of Jeffamine D400 serving as (b1) diamine compound and 0.10 parts by mole of NEO serving as (b3) epoxy resin were evenly stirred to form a clear solution. The reactants ratio is (a):(b1)+(b3)=0:1. A thermal conductive powder such as aluminum oxide was added into the clear solution. The weight of aluminum oxide and the weight of (b1) diamine compound and (b3) epoxy resin had a ratio of 70:30. The mixture was evenly mixed and then coated by a blade to form a film, which was baked to form a thermal interface layer with a thermal conductivity of 1.88 W/m*K.

Comparative Example 10

0.05 parts by mole of Jeffamine D400 serving as (b1) diamine compound and 0.10 parts by mole of NEO serving as (b3) epoxy resin were dissolved in 2.00 mL of DMAc to form a clear solution. The reactants ratio is (a):(b1)+(b3) =0:1. A thermal conductive powder such as aluminum oxide was added into the clear solution. The weight of aluminum oxide and the weight of (b1) diamine compound and (b3) epoxy resin had a ratio of 98:2. The mixture was evenly mixed and then coated by a blade to form a film, which was baked to form a thermal interface layer with a thermal conductivity of 4.1 W/m*K. As shown in Examples 27 and 28 and Comparative Examples 9 and 10, the thermal conductivity of thermal interface materials using polymers formed without (a) benzaldehyde compounds is significantly lower than that of thermal interface materials formed with polymers formed with (a) benzaldehyde compounds. t It will be apparent to those skilled in the art that various modifications and variations can be made to the disclosed methods and materials. It is intended that the specification and examples be considered exemplary only, with the true scope of the disclosure being indicated by the following claims and their equivalents.

What is claimed is:

1. A polymer, formed by reacting a (a) benzaldazine compound with a (b2) dianhydride compound, formed by reacting the (a) benzaldazine compound with a (b1) diamine compound and the (b2) dianhydride compound, or formed by reacting the (a) benzaldazine compound with the (b1) diamine compound and a (b3) epoxy resin, wherein the (a) benzaldazine compound has a chemical structure of

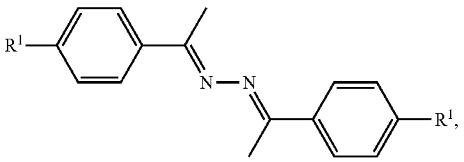

in which $R^1$ is —$NH_2$, wherein the (b1) diamine compound comprises 4,4'-oxydianiline, polyetheramine, 4,4'-diaminodiphenylmethane, trimethylene bis(4-aminobenzoate), 4,4'-bis(4-amino phenoxy)biphenyl, 4,4'-methylenebis(2-methylcyclohexylamine), bis(aminomethyl) norbornane, or 1,4-bis(aminopropyl)piperazine, and wherein the (b2) dianhydride compound comprises 4,4'-oxydiphthalic anhydride, 4,4'-(4,4'-isopropylidenediphenoxy)bis(phthalic anhydride), 1,2,4,5-cyclohexane tetracarboxylic dianhydride, pyromellitic dianhydride, 3,3'-4,4'-biphenyl tetracarboxylic dianhydride, 4,4'-(hexafluoro isopropylidene)diphthalic anhydride, or benzophenone-3,3'4,4'-tetracarboxylic dianhydride.

2. The polymer as claimed in claim 1, wherein parts by mole of the (a) benzaldazine compound and parts by mole of the (b1) diamine compound, the (b2) dianhydride compound, the (b3) epoxy resin, or a combination thereof have a ratio of 0.11:1 to 2:1.

3. The polymer as claimed in claim 1, wherein the (b3) epoxy resin comprises bisphenol A epoxy resin, 3,3',5,5'-tetramethyl-4,4'-diphenol diglycidyl ether, neopentyl glycol diglycidyl ether, hydrogenated bisphenol A epoxy resin, 1,4-cyclohexanedimethanol diglycidyl ether, or N,N-diglycidyl-4-glycidyloxyaniline.

4. A thermal interface material, comprising:

2 to 30 parts by weight of the polymer as claimed in claim 1; and 70 to 98 parts by weight of an inorganic powder.

5. The thermal interface material as claimed in claim 4, wherein the inorganic powder comprises aluminum oxide, aluminum nitride, boron nitride, silicon carbide, magnesium oxide, zinc oxide, or a combination thereof.

6. The thermal interface material as claimed in claim 4, wherein the thermal interface material has a thermal conductivity of 2.0 W/m*K to 10.0 W/m*K.

* * * * *